(12) United States Patent
Abe

(10) Patent No.: US 7,539,092 B2
(45) Date of Patent: May 26, 2009

(54) OPTICAL DISK PLAYBACK APPARATUS AND DECODER DETERMINING TEXT INFORMATION

(75) Inventor: Koichi Abe, Aichi (JP)

(73) Assignee: Sanyo Electric Co., Ltd., Osaka (JP)

( * ) Notice: Subject to any disclaimer, the term of this patent is extended or adjusted under 35 U.S.C. 154(b) by 641 days.

(21) Appl. No.: 11/129,575

(22) Filed: May 16, 2005

(65) Prior Publication Data
US 2005/0264859 A1 Dec. 1, 2005

(30) Foreign Application Priority Data
May 17, 2004 (JP) ............... 2004-146166
May 21, 2004 (JP) ............... 2004-151476

(51) Int. Cl.
*G11B 7/00* (2006.01)
(52) U.S. Cl. .................................. 369/47.1
(58) Field of Classification Search ............. None
See application file for complete search history.

(56) References Cited

U.S. PATENT DOCUMENTS

2003/0086350 A1 * 5/2003 Kurashina et al. ....... 369/59.25

FOREIGN PATENT DOCUMENTS

| JP | 64-032783 | 2/1989 |
| JP | 10-188452 | 7/1998 |
| JP | 2000-113644 | 4/2000 |
| JP | 2002-025197 | 1/2002 |
| JP | 2003-36650 | 2/2003 |
| JP | 2003-036650 | 2/2003 |

OTHER PUBLICATIONS

Japanese Office Action in Japanese Application No. 2004-151476, dated Jun. 17, 2008.
Notification of Reasons for Rejection from Japanese Patent Application No. 2004-146166 dated Oct. 21, 2008. (2 pages).

* cited by examiner

*Primary Examiner*—Joseph Feild
*Assistant Examiner*—Joseph Haley
(74) *Attorney, Agent, or Firm*—Fish & Richardson P.C.

(57) ABSTRACT

A decoder is provided which, in parallel with decoding into TOC information from sub-Q data read out from the lead-in area of an optical disk, decodes into TEXT information from sub-R-W data read out and determines whether the TEXT information is present based on the sub-R-W data. The decoder, while decoding into plural packs of TEXT information, performs error detection on the decoded-into TEXT information based on error detection codes included in the respective packs, and sends to a microcomputer, if a result of the error detection is normal, a first data set consisting of corresponding decoded-into header information and TEXT content and, if a result of the error detection is not normal, a second data set which is of the same data size as the first data set and which is an indication code indicating that the result of the error detection is not normal.

9 Claims, 13 Drawing Sheets

OPTICAL DISK PLAYBACK APPARATUS AND DECODER DETERMINING TEXT INFORMATION

CROSS-REFERENCE TO RELATED APPLICATIONS

The present application claims priority from Japanese Patent Application No. 2004-146166 filed on May 17, 2004 and Japanese Patent Application No. 2004-151476 filed on May 21, 2004, which are herein incorporated by reference.

BACKGROUND OF THE INVENTION

1. Field of the Invention

The present invention relates to an optical disk playback apparatus and a decoder.

2. Description of the Related Art

Optical disk playback systems to playback optical disks compliant with a CD standard perform various displays based on information played back from the optical disk. For example, generally in CD standards, based on Q channel data (hereinafter, called "sub-Q data") of sub-code information recorded in a lead-in area, track numbers and time information assigned to the track numbers, and the like are recorded in the lead-in area, as the sub-Q data of the sub-code information. Hence, the optical disk playback system reads out the sub-Q data from the lead-in area and decodes/playbacks the data, and thereby various displays can be performed.

Furthermore, a CD-TEXT standard has been proposed for recording TEXT information such as album titles and song titles in addition to audio information on an optical disk. Note that in the CD-TEXT standard, the TEXT information has a maximum of 8 blocks for each language, and one block has a maximum of 255 packs. One pack as a minimum unit consists of 18 bytes, 2 bytes of which are a CRC (Cyclic Redundancy Check) code. In the CD-TEXT standard, the TEXT information in the above format is recorded as R-W channel data (hereinafter, called "sub-R-W data") of the sub-code information in the lead-in area. Hence, optical disk playback apparatuses compliant with the CD-TEXT standard (hereinafter, called "CD-TEXT playback apparatuses") can display the TEXT information by reading out the sub-R-W data from the lead-in area and decoding/playing back the data.

FIG. 18 shows the configuration of a conventional CD-TEXT playback apparatus. See for example Japanese Patent Application Laid-open Publication No. 2003-36650.

An optical pickup 301 reads out information recorded on an optical disk 100 by irradiating laser light onto the optical disk 100 and detecting return light. A preamp 302 generates an RF signal by amplifying with a predetermined gain a light-detected signal from the optical pickup 301. Further, the preamp 302 binarizes the RF signal, an analog signal, to convert into a binary digital signal. An EFM demodulator 303 performs EFM (Eight to Fourteen Modulation) demodulation on the binarized RF signal generated in the preamp 302. The EFM-demodulated signal is sent to a sub-code decoder 304.

The sub-code decoder 304 decodes the sub-code information. Of the decoded sub-code information, sub-P and sub-Q data is sent to a microcomputer 306, and sub-R-W data is sent to a CD-TEXT decoder 305. Note that the sub-code decoder 304 performs CRC based on a CRC code included in the sub-Q data and detects whether the result of decoding the sub-Q data is normal. The CRC result is sent to the microcomputer 306 before the sub-Q data is sent.

The CD-TEXT decoder 305 (a "decoder") decodes into the TEXT information according to the CD-TEXT standard from the sub-R-W data sent from the sub-code decoder 304. Also, each time TEXT information is decoded into, the CD-TEXT decoder 305 performs CRC based on a CRC code included in the TEXT information to detect whether the result of decoding into the TEXT information is normal. One bit indicating this CRC result (e.g., "1" when normal and "0" when not normal) is sent to the microcomputer 306.

The microcomputer 306 controls the whole of the optical disk playback system, that is, the CD-TEXT playback apparatus overall. For example, when the CRC result for the sub-Q data sent from the sub-code decoder 304 is normal, the microcomputer. 306 acquires the sub-Q data from the sub-code decoder 304 and stores it in a RAM 307. Also, when the CRC result of one bit sent from the CD-TEXT decoder 305 indicates being normal, the microcomputer 306 acquires 16 bytes of TEXT data (ID1 to ID4 of one byte each and 12 bytes of TEXT content) that is the result of decoding into the TEXT information from the CD-TEXT decoder 305 and stores it in the RAM 307.

Then, the microcomputer 306 analyzes TOC (Table of Contents) information based on the sub-Q data stored in RAM 307 to acquire information about positions on the optical disk 100 where desired music programs are recorded. While playing back a desired music program based on the position information, synchronously, the microcomputer 306 reads out the TEXT data stored in the RAM 307 and displays the TEXT information.

Note that in order to utilize the existing mechanisms of conventional CD-TEXT playback apparatuses, a microcomputer having a data bus width of 4 or 8 bits or the like is often used as the microcomputer 306, although high-performance microcomputers of a 32/64-bit data bus width have been developed in recent years. As such, because a low-performance microcomputer 306 is used, it is difficult to perform in parallel the processing of the sub-Q data (10 bytes) sent from the sub-code decoder 304 in 1/75 sec (13.3 ms) corresponding to one sub-coding frame, and the real-time processing of the TEXT data (64 bytes) sent from the CD-TEXT decoder 305 in each 1/75 sec.

Accordingly, the conventional CD-TEXT playback apparatus compliant with the CD-TEXT standard first accesses the lead-in area and reads out the sub-code information, and the sub-code decoder 304 decodes the sub-Q data and performs CRC. Then, if the CRC result for the sub-Q data is normal, the apparatus accesses the lead-in area again and reads out the sub-code information, and the CD-TEXT decoder 305 decodes the sub-R-W data into the TEXT information and performs CRC.

Moreover, the microcomputer 306 acquires the TEXT data and the CRC results from the CD-TEXT decoder 305, and determines, if respective CRC results for packs of the TEXT information are consecutively normal, that the TEXT information is present, and if CRC results are not consecutively normal, that no TEXT information is present.

The conventional CD-TEXT playback apparatus as shown in FIG. 18 has to wait for the completion of the decoding of the sub-Q data and CRC and the re-access to the lead-in area in order to determine whether or not TEXT information is recorded on an optical disk. Also for optical disks compliant with CD standards other than CD-TEXT, before determining that no TEXT information is present on the optical disk, the decoding of the sub-Q data and CRC and the re-access to the lead-in area and then the decoding of the TEXT information and CRC have to be completed. This causes the delay of the determination of whether TEXT information is present itself and the delay of optical disk playback processing to be performed after the determination of whether TEXT information is present, such as the display of TEXT information and producing audio output.

In the conventional CD-TEXT playback apparatus as shown in FIG. 18, by the time the microcomputer acquires 16 bytes of TEXT data from the CD-TEXT decoder 305, the microcomputer has to perform a procedure: acquiring one bit of CRC result, and determining the CRC result. This causes an increase in the processing load on the microcomputer, and also the delay of optical disk playback processing such as the display of TEXT information decoded-into in the CD-TEXT decoder and producing audio output.

SUMMARY OF THE INVENTION

To solve the above and other problems, according to one aspect of the present invention there is provided an optical disk playback apparatus which reads out sub-code information recorded in advance from a lead-in area of a CD standard optical disk, and decodes into and playbacks TEXT information according to a CD-TEXT standard from R-W channel data of the sub-code information, the playback apparatus comprising a decoder that decodes into the TEXT information from the R-W channel data of the sub-code information read out from the lead-in area and determines whether the TEXT information is present based on the R-W channel data, in parallel with decoding into TOC information from Q channel data of the sub-code information read out.

To solve the above and other problems, according to another aspect of the present invention there is provided an optical disk playback apparatus having a decoder which decodes R-W channel data of sub-code information read out from a lead-in area of a CD standard optical disk into TEXT information formed from a plurality of packs that each comprise header information according to a CD-TEXT standard, a TEXT content, and an error detection code, while performing error detection on the decoded-into TEXT information based on the error detection codes included in the respective packs, and a microcomputer which, if a result of the error detection is normal, makes corresponding decoded-into TEXT content be displayed, wherein the decoder sends to the microcomputer, if a result of the error detection is normal, a first data set consisting of corresponding decoded-into header information and TEXT content and, if a result of the error detection is not normal, a second data set which is of the same data size as the first data set and which is an indication code indicating that the result of the error detection is not normal, and the microcomputer, when receiving the first data set, realizes that the result of the error detection is normal and makes the TEXT content included in the first data set be displayed, and when receiving the second data set, realizes that the result of the error detection is not normal.

According to the present invention, optical disk playback processing can be speeded up.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

CD Standards in General

Figure 10:
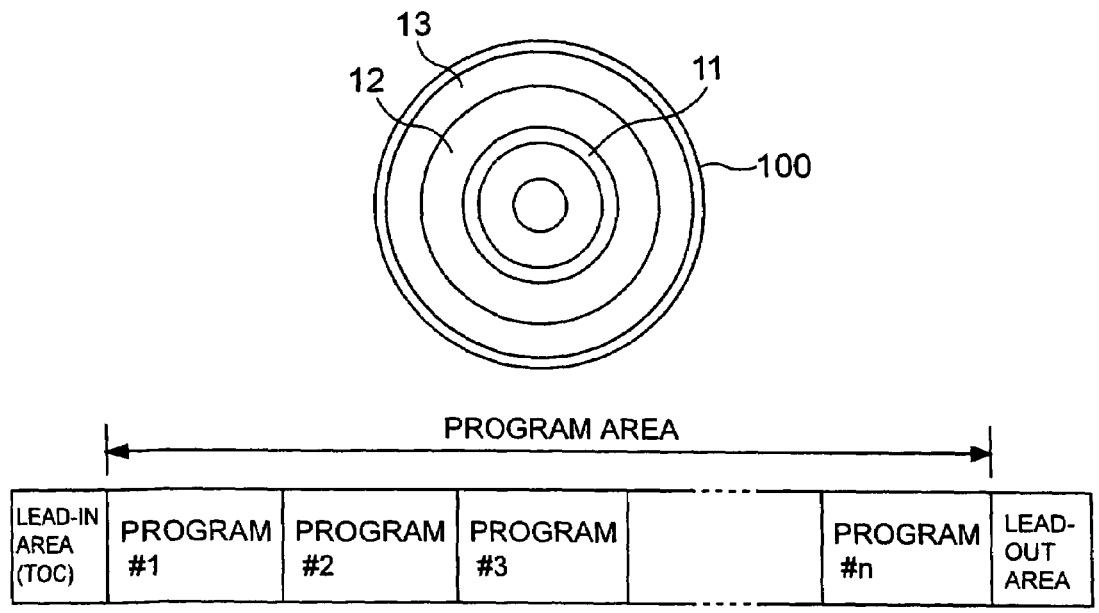
FIG. 10 is a diagram showing the physical format of an optical disk.

FIG. 10 shows the physical format of an optical disk 100 compliant with CD standards (CD-DA, CD-ROM, CD-R, CD±RW, and the like). On the optical disk 100, from the innermost circumference to the outermost circumference, there are formed a lead-in area 11 where TOC information is recorded, a program area 12 where program data such as audio information is recorded, and a lead-out area 13 that is an area indicating the end of program record.

When audio information is recorded on the optical disk 100, first, audio information is sampled under conditions of a sampling frequency being 44.1 kHz and the number of bits in quantization being 16. 16 bits of sampled audio information is divided into 8 higher-order bits and 8 lower-order bits, each of which is handled as one symbol. And CIRC (Cross Interleave Reed-Solomon Code) encoding and interleaving are performed on each 24 symbols, each 6 samples of stereo L/R channels corresponding to 24 symbols. As a result, P parity and Q parity, which each are of 4 symbols, are added thereby forming a frame of 32 symbols in total. Furthermore, each symbol in one frame is converted by EFM modulation from 8 bits to 14 bits.

Figure 11:
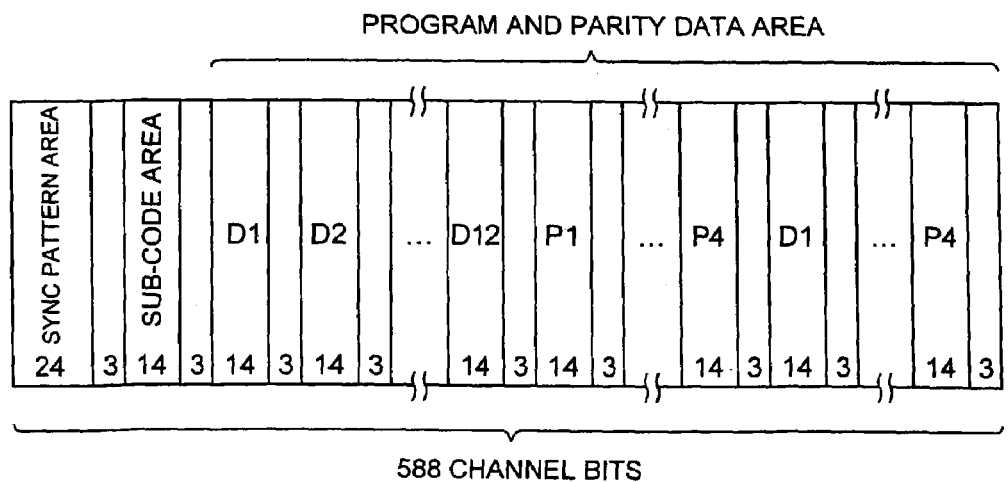
FIG. 11 is a diagram showing the data structure of one EFM frame.

FIG. 11 shows the data structure of one EFM-modulated frame (hereinafter, "one EFM frame"). As shown in FIG. 11, one EFM frame includes a synchronization pattern area of 24 channel bits, a sub-code area of 14 channel bits, and a program and parity data area of 32 symbols times 14 channel bits. Three channel bits are disposed between these areas to combine them. Thus, one EFM frame has a total of 588 bits.

Figures 12, 13:
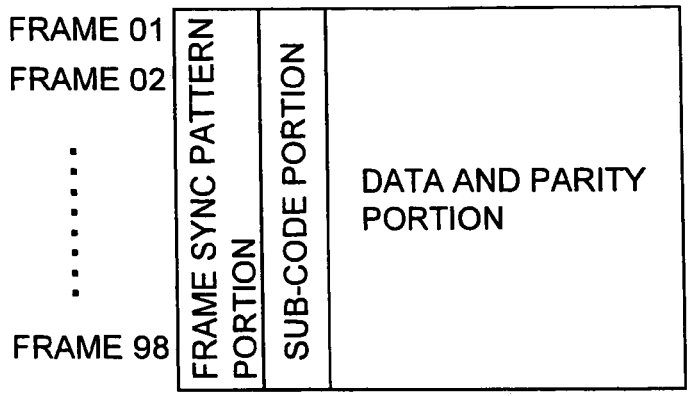
FIG. 12 is a diagram showing the data structure of one sub-coding frame.
FIG. 13 is a diagram showing the data structure of a sub-code portion of the one sub-coding frame.

FIG. 12 shows the data structure of one sub-coding frame. One sub-coding frame consists of 98 EFM frames shown in FIG. 11. As shown in FIG. 12, one sub-coding frame includes a frame synchronization pattern, a sub-code portion, and a data and parity portion. Note that one sub-coding frame corresponds to 1/75 sec (13.3 ms) of playback time.

FIG. 13 shows the data structure of the sub-code portion of one sub-coding frame shown in FIG. 12. As shown in FIG. 13, the first frames 01, 02 are the synchronization patterns S0, S1 of one sub-coding frame. These synchronization patterns S0, S1 are two predetermined patterns nonstandard in the EFM conversion format. The frames 03 to 98 each have P, Q, R, S, T, U, V, W channel data (hereinafter, called "sub-P-W data").

The sub-P data represents a pause between programs and is provided to give a rough cue when searching for a program. The sub-Q data includes information such as absolute time information on the optical disk 100, time information of each program, and the identification number of each program, and is used as TOC information to be recorded in the lead-in area 11.

Figure 14:
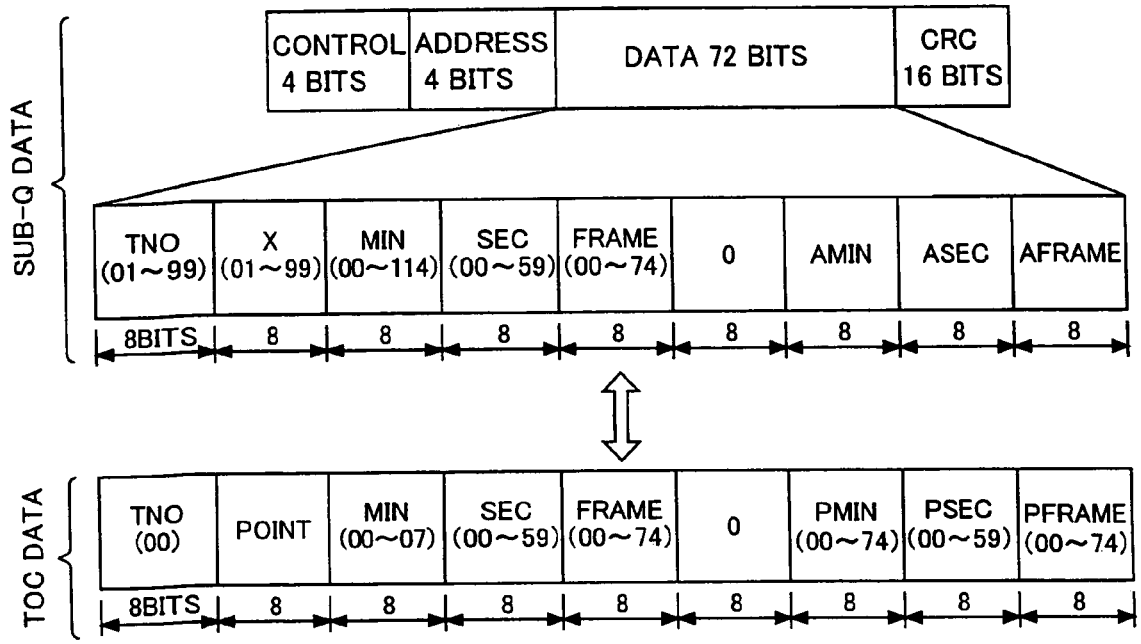
FIG. 14 is a diagram showing the data structure of Q channel data and TOC data.

FIG. 14 shows the data structure of the sub-Q data and TOC information. The sub-Q data includes 4 bits of control data for identifying the number of audio channels, emphasis and the like, 4 bits of address data indicating the mode of the sub-Q data, 72 bits of data, and a CRC code for CRC of the sub-Q data.

When the address data of the sub-Q data is at one, the 72bits of data form a format including music chapter number TNO, an index X, elapse time in the music chapter (MIN, SEC, FRAME), all zero, and absolute time (AMIN, ASEC, AFRAME). This format is associated with TOC information. That is, the TOC information includes music chapter number TNO, POINT, elapse time in the music chapter (MIN, SEC, FRAME), and absolute time of POINT contents and has a data length of 72 bits in total. In order to reread the TOC information when error is detected, TOC information representing the same contents is repeatedly recorded in the lead-in area 11.

CD-TEXT Standard

The CD-TEXT standard is a standard to record on music CDs TEXT information such as a title, the performer, the songwriter, the composer, the arranger, and a message, and deals with a maximum of 8 national languages. Furthermore, in the CD-TEXT standard, the TEXT information includes 6 channels of sub-code information that is sub-R-W data, and is recorded in the lead-in area 11.

Figure 15:
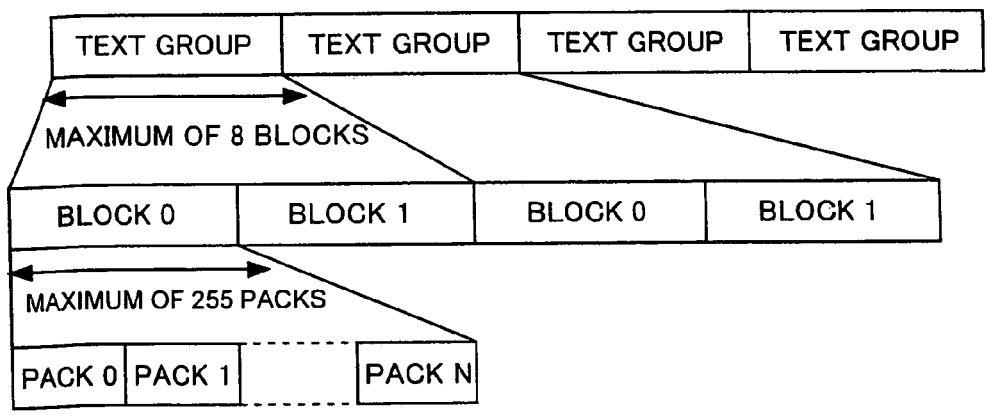
FIG. 15 is a diagram showing the outline of a CD-TEXT standard.
Figure 16:
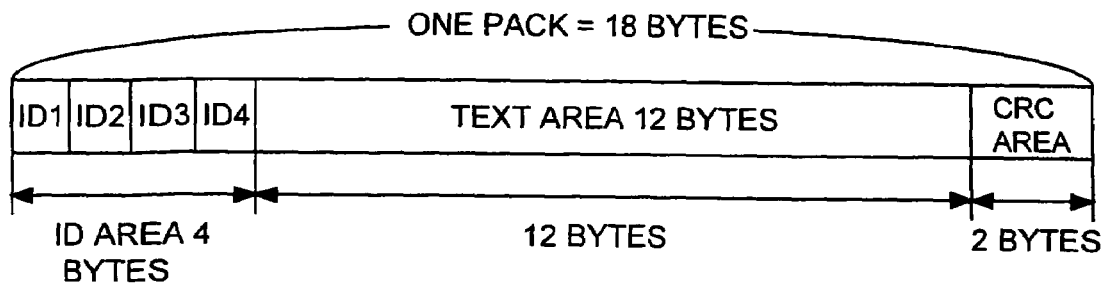
FIG. 16 is a diagram showing the data structure of one pack.
Figure 17:
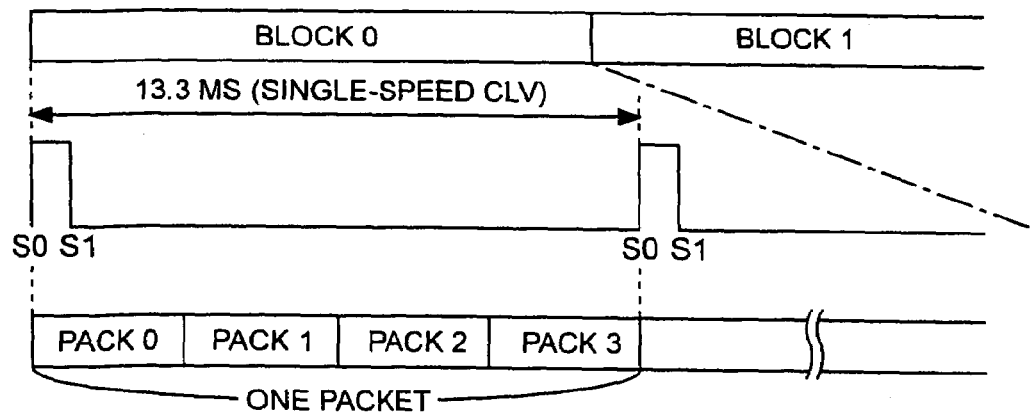
FIG. 17 is a diagram showing the format of one block of TEXT information.

FIG. 15 shows the outline of the CD-TEXT standard. In the lead-in area 11, TEXT groups each corresponding to one language as units are recorded. One TEXT group consists of a maximum of 8 blocks, and each block consists of packs 0 to n (a maximum of 255 packs). Here, one pack is the smallest unit of the TEXT information in the CD-TEXT standard. As shown in FIG. 16, one pack consists of a total of 18 bytes that are 4 bytes of ID1 to ID4, 12 bytes of TEXT content, and 2 bytes of CRC code. Moreover, as shown in FIG. 17, in one block of one TEXT group, one packet consisting of 4 packs is recorded to be synchronous with the synchronization patterns S0, S1 having a period of 1/75 sec.

The 4 bytes of ID1 to ID4 are header information for one pack. The ID1 is an identification code to indicate the type of TEXT information recorded in the one pack, such as an album/program name, performer, songwriter, and composer. The ID2 is a track number of from 1 to 99. Note that the MSB (most significant bit) of the ID2 is reserved and always zero. The ID3 is a sequence number assigned to the pack. The sequence number of one pack in one block is of, for example, from 0 to 255. The ID4 consists of one bit of DBCC (Double Byte Character Code) and 3 bits of block number, and 4 bits indicating the position of characters.

The 2 bytes of CRC code is an error detection code for a total of 16 bytes of ID1 to ID4, i.e. header information, and the TEXT information. Note that in the format of the CD-TEXT standard, it is configured such that when a data error is detected through CRC, without performing error correction, the sub-R-W data is reread from the lead-in area 11.

FIRST EMBODIMENT

Configuration of a CD-TEXT Playback Apparatus

Figure 1:
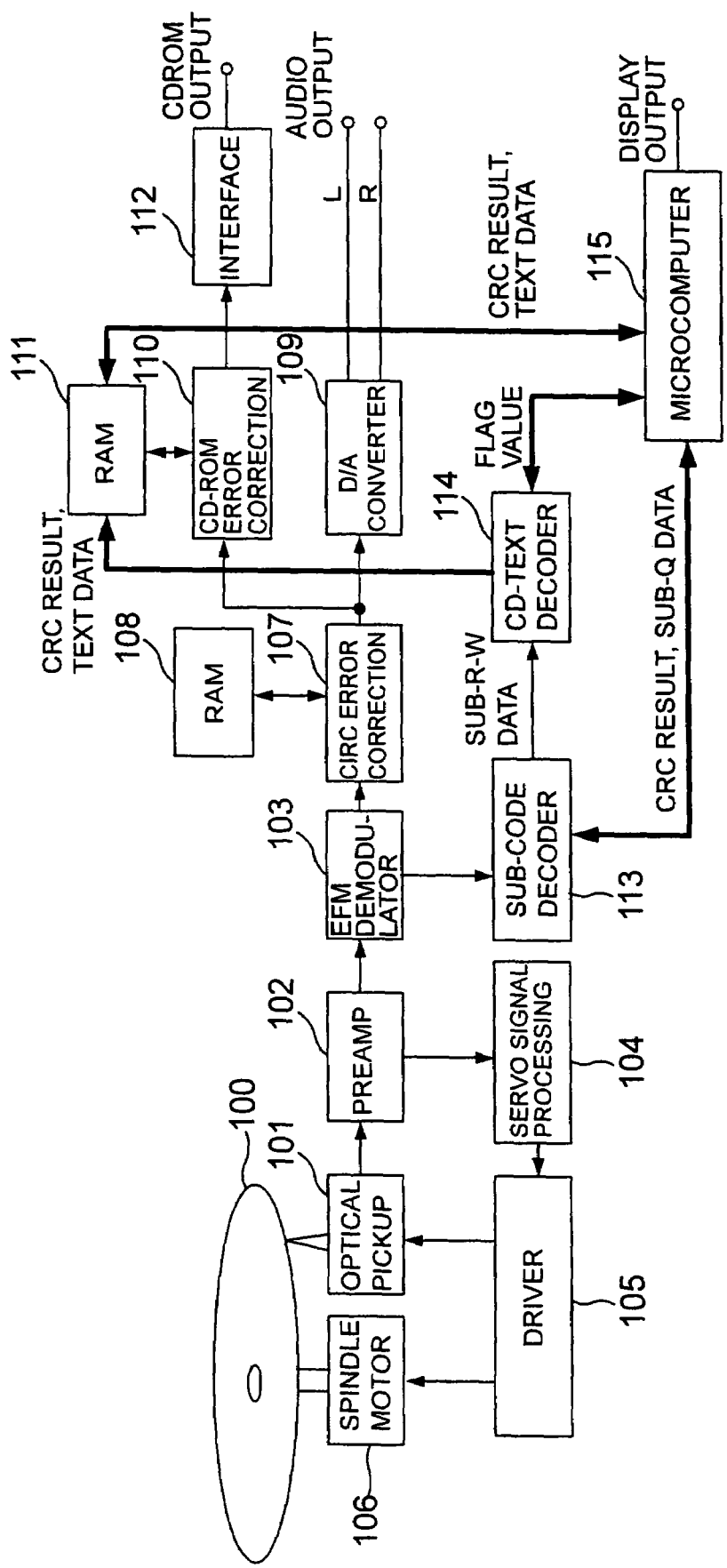
FIG. 1 is a diagram illustrating the configuration of an optical disk playback apparatus according to a first embodiment of the present invention.

FIG. 1 is a diagram illustrating the configuration of a CD-TEXT playback apparatus according to a first embodiment of the present invention. The CD-TEXT playback apparatus according to the invention is compliant with the CD-DA standard related to the playback of audio information, particularly the CD-TEXT standard included in the CD-DA standard, and the CD-ROM standard related to the playback of digital information such as applications for computers. Further, the playback apparatus may be an optical disk recording/playback system compliant with the CD-R standard or the CD-RW standard related to optical disk recording as well.

An optical pickup 101 comprises a laser device, an objective lens, a photo-detector, and a servo mechanism (none of which are shown), and reads out information recorded on an optical disk 100 by irradiating laser light onto the optical disk 100 and detecting return light.

A preamp 102 generates an RF signal by amplifying with a predetermined gain a signal detected by the optical pickup 101. Further, the preamp 102 binarizes the RF signal, an analog signal, to convert into a binary digital signal. In the preamp 102, servo control signals such as a tracking error signal and a focus error signal are generated and sent to a servo signal processing section 104.

An EFM demodulator 103 performs EFM demodulation on the binarized RF signal generated in the preamp 102. The EFM-demodulated signal is sent, when being audio information, to a CIRC (Cross Interleave Reed Solomon) error correction section 107 and, when being sub-code information, to a sub-code decoder 113. Note that the binarized RF signal generated in the preamp 102 is sent to a PLL circuit (not shown) to generate a bit clock signal.

The servo signal processing section 104 controls the driving of various servo mechanisms of the optical pickup 101 and the driving of a spindle motor 106 via a driver 105 based on the servo control signals sent from the preamp 102 and the above bit clock signal.

The CIRC error correction section 107 temporarily stores the EFM-demodulated signal for audio information sent from the EFM demodulator 103 in the RAM 108. And error correction based on C1 and C2 series of Reed-Solomon code according to the CIRC scheme is performed on the EFM-demodulated signal stored in the RAM 108. Here, where audio information is recorded in the program area of the optical disk 100, a decoded digital audio signal is obtained as a result of error correction in the CIRC error correction section 107. This decoded digital audio signal is converted by a D/A converter 109 into an analog audio signal, and audio-outputted through Lch and Rch terminals to the outside.

Where digital information according to the CD-ROM standard is recorded in the program area of the optical disk 100, a decoded digital signal according to the CD-ROM standard is obtained as a result of error correction in the CIRC error correction section 107. Note that in the CD-ROM standard, in order to ensure a very low bit error rate (10 to the power of minus 12) meaning high reliability for computers, it is specified that error correction based on P and Q series of Reed-Solomon code as well as CIRC error correction be performed.

A CD-ROM error correction section 110 performs error correction for CD-ROMs, and a RAM 111 is provided as work memory. That is, the digital signal decoded in the CIRC error correction section 107 is temporarily stored in the RAM 111. By performing error correction based on the P and Q series of Reed-Solomon code on the digital signal stored in the RAM 111, the decoding of the digital signal according to the CD-ROM standard is completed. This decoded digital signal is output to an external computer or the like through an interface section 112 such as an ATAPI (ATA Packet Interface) or a SCSI (Small Computer System Interface).

A sub-code decoder 113 decodes the sub-code information consisting of the sub-R-W data recorded in the lead-in area 11 of the optical disk 100. The sub-P and sub-Q data of the decoded sub-code information is sent to a microcomputer 115, and at the same time the sub-R-W data is sent to a CD-TEXT decoder 114. Note that the sub-code decoder 113 performs CRC based on the CRC code included in sub-Q data detected in 1/75 sec to detect whether the result of decoding the sub-Q data is normal. The CRC result is sent to the microcomputer 115 before sending the sub-Q data. Thus, the microcomputer 115 acquires the sub-Q data from the sub-code decoder 113 if the CRC result for the sub-Q data is normal.

The CD-TEXT decoder 114 is an embodiment of the "decoder" according to the first embodiment of the present invention. The CD-TEXT decoder 114 decodes into the TEXT information according to the CD-TEXT standard from the sub-R-W data sent from the sub-code decoder 113. Also, each time TEXT information is decoded, the CD-TEXT decoder 114 performs CRC based on the CRC code included in the TEXT information to detect whether the result of decoding into the TEXT information is normal. The CRC result for the TEXT information is used to determine whether the TEXT information is recorded on the optical disk 100. Note that the CRC results for TEXT information together with TEXT data that is the result of decoding the TEXT information are sequentially stored in the RAM 111 not via the microcomputer 115.

That is, in parallel with the sub-code decoder 113 and microcomputer 115 analyzing TOC information based on the sub-Q data read out from the lead-in area 11 of the optical disk 100, the CD-TEXT decoder 114 decodes into TEXT information the sub-R-W data of the sub-code information read out at the same time as the sub-Q data, and determines whether the TEXT information is present based on the sub-R-W data.

The microcomputer 115 controls the whole of the CD-TEXT playback apparatus overall. For example, to display decoded-into TEXT information from the optical disk 100, the microcomputer 115 analyzes TOC information based on the sub-Q data sent from the sub-code decoder 113 and acquires information about the position on the optical disk 100 where a desired music program is recorded, and the like. Then, based on this position information, the servo of the optical pickup 101 is controlled to read and playback the desired music program.

Moreover, where TEXT information is recorded on the optical disk 100, in order to perform display processing on TEXT information corresponding to a desired music program synchronously with the playback of the desired music program, the microcomputer 115 searches for and acquires the desired TEXT data already stored in the RAM 111. Then, the microcomputer 115 performs predetermined display processing on the TEXT data from the RAM 111 and outputs to an external display device.

Note that the above preamp 102 and driver 105 are usually embodied as CD analog signal processing circuitry and the EFM demodulator 103, servo signal processing section 104, CIRC error correction section 107, RAM 108, D/A converter 109, CD-ROM error correction section 110, RAM 111, interface section 112, sub-code decoder 113, and CD-TEXT decoder 114 are usually embodied as CD digital signal processing circuitry. A CD-TEXT signal processing circuit according to the present invention is embodied as the CD-TEXT decoder 114.

Configuration of the CD-TEXT Decoder

Figure 2:
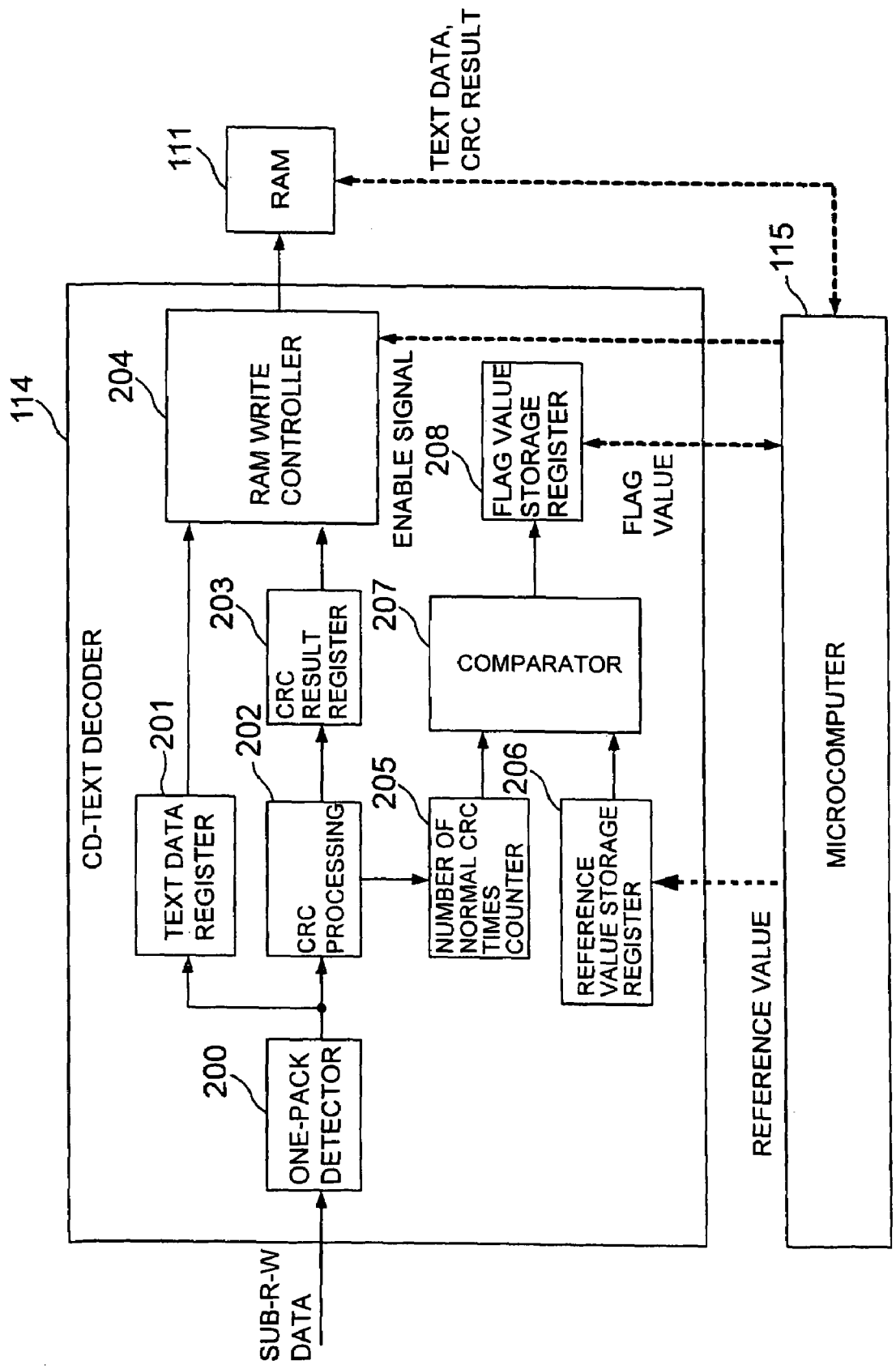
FIG. 2 is a diagram illustrating the configuration of a decoder according to the first embodiment of the present invention.

FIG. 2 is a block diagram showing the configuration of the CD-TEXT decoder 114 according to the first embodiment of the present invention.

A one-pack detector 200 detects one pack of sub-R-W data from sub-R-W data which is being sent from the sub-code decoder 113 sequentially on a one packet (4 packs) basis on the basis of the synchronization patterns S0, S1 having a period of 1/75 sec, and decodes the one pack of sub-R-W data into one pack of TEXT data. Packs of decoded-into TEXT data are sequentially stored in a TEXT data register 201. Note that one pack of TEXT data stored in the TEXT data register 201 includes 4 bytes of header information ID1 to ID4 and 12 bytes of TEXT content and not a CRC code.

A CRC processing section 202 performs CRC based on the CRC code included in one pack of decoded-into TEXT data, and the CRC results are sequentially stored in a CRC result register 203. For example, the CRC result is at 1 when an error is not detected according to the CRC scheme (when normal) and at 0 when an error is detected (when not normal).

In a RAM write controller 204, the enable/disable of writing into the RAM 111 is set based on an enable signal supplied from the microcomputer 115. When writing into the RAM 111 is enabled, the RAM write controller 204 writes packs of TEXT data stored in the TEXT data register 201 and the CRC results stored in the CRC result register 203 sequentially one pack each time into the RAM 111.

A number of normal CRC times counter 205, a reference value storage register 206, a comparator 207, and a flag value storage register 208 are provided to determine that TEXT information is present if in the CRC results for a predetermined number of packs of TEXT data the number of times when normal is above a predetermined reference value and to determine that TEXT information is nonexistent if the number of times when normal is at or below the predetermined reference value. Note that the predetermined number of packs may be, for example, four packs (one packet), which are a minimum unit of TEXT information. That is, by determining whether TEXT information is present based on the CRC results for four packs, it can be quickly determined whether TEXT information is present. The configuration of the number of normal CRC times counter 205, the reference value storage register 206, the comparator 207, and the flag value storage register 208 will be described below.

The number of normal CRC times counter 205 counts the number of times when normal in the CRC results for 4 packs of TEXT data. Each time the detection for 4 packs finishes, the count is reset, and the counter 205 starts to count for the next 4 packs of TEXT data.

The reference value storage register 206 is a register that stores the reference value with which the comparator 207 compares the count of the number of normal CRC times counter 205. The microcomputer 115 sets the reference value at, for example, 2 or 4 for the CRC results for 4 packs.

The comparator 207 compares the count of the number of normal CRC times counter 205 with the reference value in the reference value storage register 206. In this comparison, if the count is above the predetermined reference value, it is determined that TEXT information is present, and if the count is at or below the predetermined reference value, it is determined that TEXT information is nonexistent.

The flag value storage register 208 is a register that stores the comparing result of the comparator 207 as a flag value. The flag value stored in the flag value storage register 208 is monitored by the microcomputer 115 always or at appropriate timings. Thus, when performing display processing on desired TEXT information, if the flag value stored in the flag value storage register 208 indicates that the TEXT information is present, the microcomputer 115 searches for and reads out TEXT data corresponding to the desired TEXT information already stored in the RAM 111.

Operation of the CD-TEXT Playback Apparatus

The operation of the CD-TEXT playback apparatus according to the first embodiment of the present invention will be described with reference to the flow charts shown in FIGS. 3, 4.

Writing of TEXT Data

Figure 3:
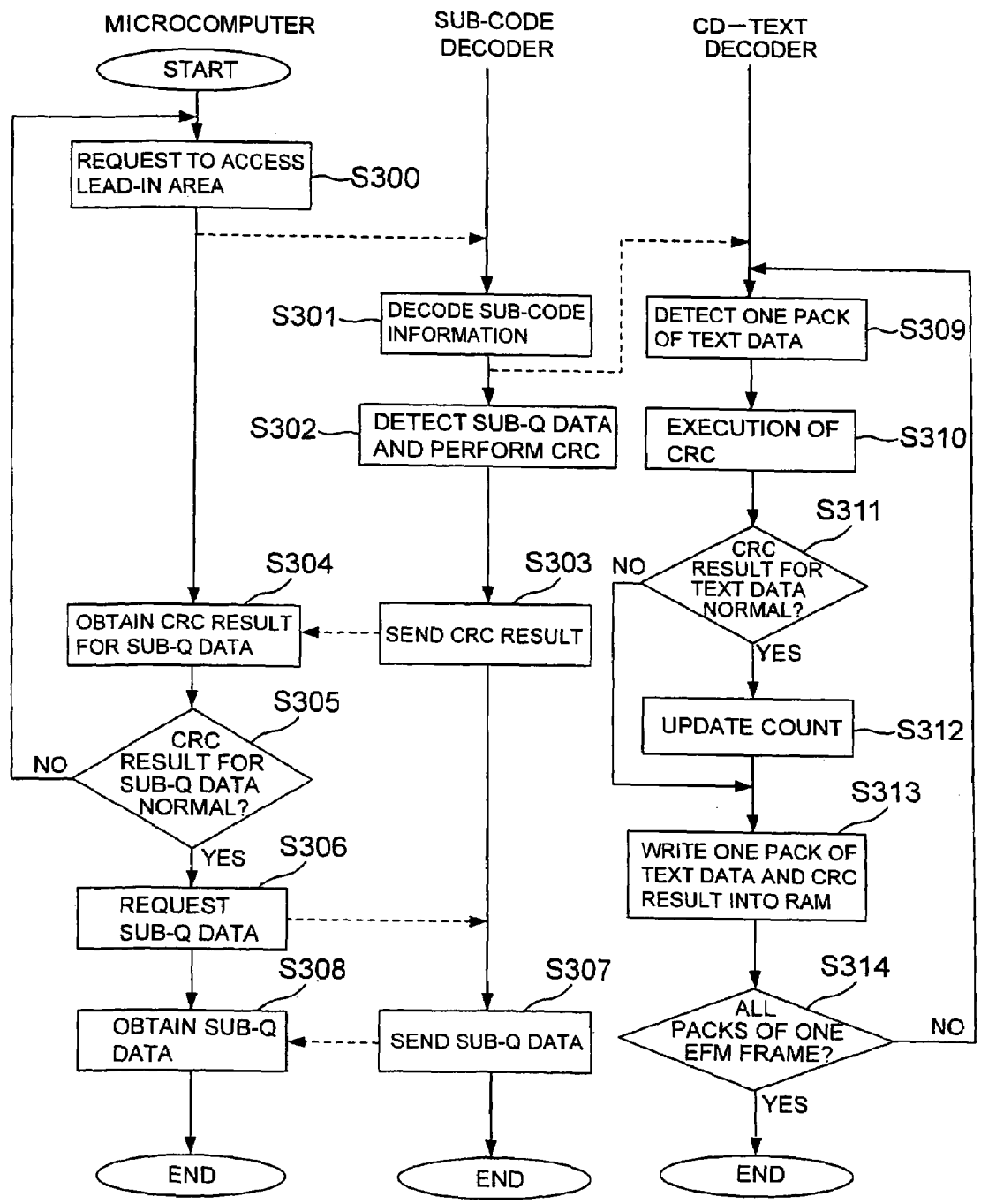
FIG. 3 is a flow chart showing a flow of optical disk playback processing according to the first embodiment of the present invention.

The flow chart of FIG. 3 explains the operation by the CD-TEXT decoder 114 of writing TEXT data and its CRC result into the RAM 111 in parallel with analyzing TOC information based on the sub-Q data. For convenience of description, up to the completion of the processing of 4 packs in one EFM frame of blocks forming TEXT information by the CD-TEXT decoder 114 will be described.

First, in order to read out sub-code information recorded in the lead-in area 11 of the optical disk 100, the microcomputer 115 makes the servo signal processing section 104 activate the servo control of the optical pickup 101 (S300). As a result, sub-code information is read from the lead-in area 11, and after amplified in the preamp 102, is EFM-demodulated in the EFM demodulator 103, and sent to the sub-code decoder 113. Then, the sub-code decoder 113 decodes the EFM-demodulated sub-code information (S301).

Then, the sub-code decoder 113 detects sub-Q data and performs CRC based on the decoded sub-code information (S302). And the CRC result for the sub-Q data is sent to the microcomputer 115 (S303, S304). The microcomputer 115 determines whether the CRC result sent from the sub-code decoder 113 is normal (S304), and if the CRC result is normal (S304: YES), acquires the detected sub-Q data from the sub-code decoder 113 (S306 to S308). On the other hand, if the CRC result is not normal (S304: NO), the microcomputer 115 rereads out sub-code information from the lead-in area 11.

Meanwhile, the sub-code decoder 113 sends sub-R-W data to the CD-TEXT decoder 114 when having decoded the EFM-demodulated sub-code information (S301). At this time, the sub-code decoder 113 sequentially sends to the CD-TEXT decoder 114 the sub-R-W data on a one packet (4 packs) basis on the basis of the synchronization patterns S0, S1 having a period of 1/75 sec. The CD-TEXT decoder 114, while detecting one pack of sub-R-W data by a one-pack detector 200, decodes the one pack of sub-R-W data into one pack of TEXT data (S309). The one pack of decoded TEXT data is stored in the TEXT data register 201.

Furthermore, the CRC processing section 202 performs CRC based on the CRC code included in the one pack of decoded TEXT data, and this CRC result is stored in the CRC result register 203. In parallel with the storing of the CRC result, the number of normal CRC times counter 205 counts the number of times when normal in the CRC result (S312).

Then, the CD-TEXT decoder 114, by the RAM write controller 204, writes the one pack of TEXT data stored in the TEXT data register 201 and the CRC result stored in the CRC result register 203 into the RAM 111 (S313). And steps S309 to S313 are repeated for 4 packs in the one EFM frame. Needless to say, because the TEXT information is formed from blocks as units as described above, steps S309 to S314 are repeated until the processing is complete for all packs of all EFM frames.

Reading out of TEXT Data

Figure 4:
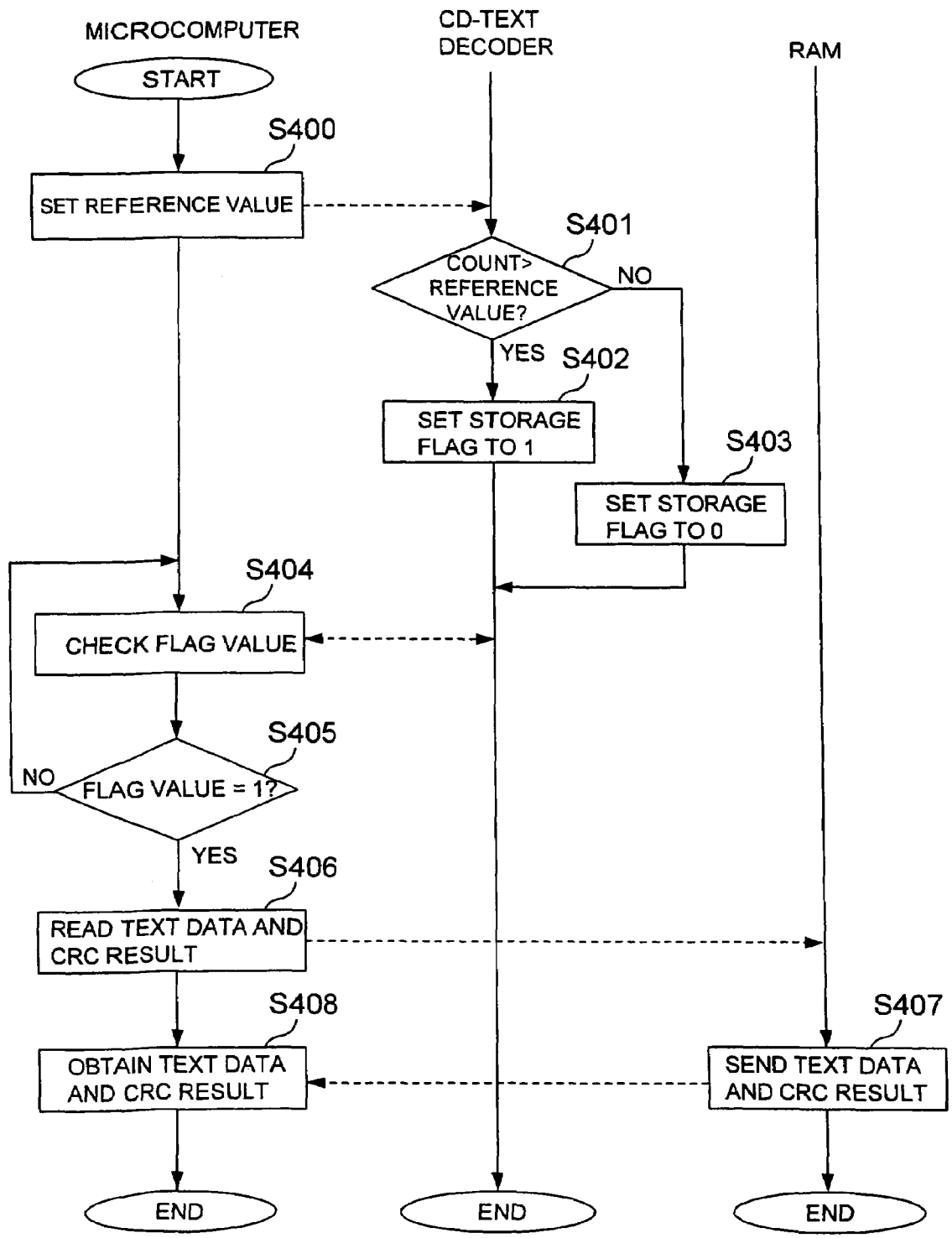
FIG. 4 is a flow chart showing a flow of optical disk playback processing according to the first embodiment of the present invention.

The flow chart of FIG. 4 explains the operation of up to reading out desired TEXT data from the RAM 111 when the microcomputer 115 has determined that the TEXT data is present.

First, the microcomputer 115 sets a reference value in the reference value storage register 206 of the CD-TEXT decoder 114 (S400). In the CD-TEXT decoder 114, the comparator 207 compares the count of the number of normal CRC times counter 205 with the reference value in the reference value storage register 206 as the number of normal CRC times counter 205 counts. If the count is above the predetermined reference value (S401: YES), it is determined that TEXT information is present, setting the flag value in the flag value storage register 208 to "1" (S402). If the count is not above the predetermined reference value, it is determined that TEXT information is not present, setting the flag value in the flag value storage register 208 to "0" (S403).

The microcomputer 115 monitors whether the flag value stored in the flag value storage register 208 is at "1" (S404, S405). The flag value being at "1" causes an interrupt (S405: YES), and because TEXT information is stored in the RAM 111, desired TEXT data and its CRC result are read out from the RAM 111 at appropriate timings, for example, for displaying them (S406 to S408). Then, the microcomputer 115 determines whether the CRC result of the TEXT data acquired from the RAM 111 is normal, and if the CRC result is normal, performs display processing on TEXT information represented by the TEXT data acquired from the RAM 111.

EXAMPLE OF EFFECTS

Figure 18:
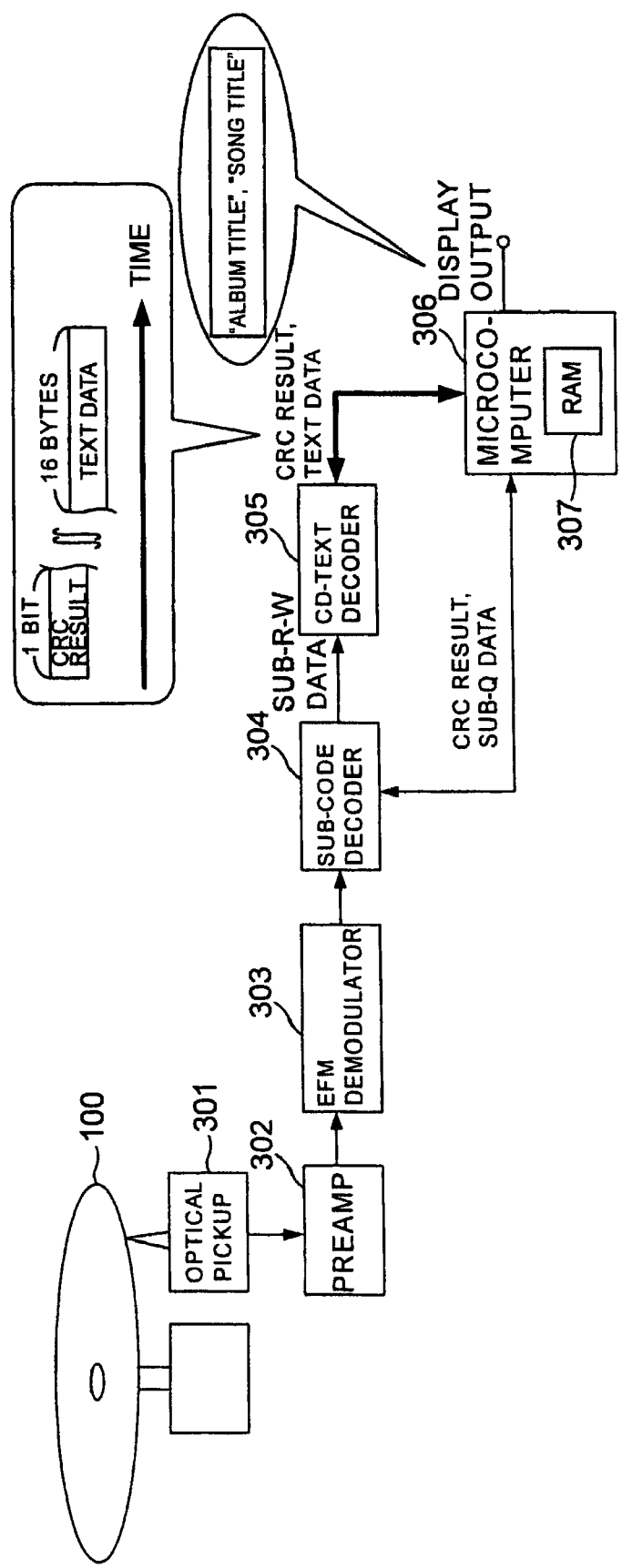
FIG. 18 is a diagram illustrating the configuration of a conventional optical disk playback apparatus.

In the case of the prior art shown in FIG. 18, the sub-code information is read out from the lead-in area 11 of the optical disk 100, and after the sub-Q data is obtained to decode-into/playback TOC information, in order to decode-into/playback TEXT information, the lead-in area 11 is re-accessed and the sub-code information is reread out. On the other hand, in the case of the present invention, in parallel with decoding-into/playing-back TOC information from the, sub-Q data of the sub-code information read out from the lead-in area 11, TEXT information is decoded into from the sub-R-W data of the sub-code information read out, while determining whether the TEXT information is present. Accordingly, it is not necessary to re-access the lead-in area 11 to decode-into/playback TEXT information as in the conventional art. Hence, in the case of the present invention, it is determined at high speed whether TEXT information is present, and thus optical disk playback processing is performed at high speed such as the display of the TEXT information and producing audio output after the determination.

In the case of the conventional art shown in FIG. 18, in order to determine whether TEXT information is present, the microcomputer 306 acquires, in real time, CRC results for TEXT data being sent sequentially on a one packet (4 packs) basis on the basis of the synchronization patterns S0, S1 having a period of 1/75 sec, and detects whether the CRC results are consecutively normal. On the other hand, in the case of the present invention, because the microcomputer 115 determines whether TEXT information is present based on the flag value stored in the flag value storage register 208, real time processing as in the prior art is not needed. Hence, in the case of the present invention, determining whether TEXT information is present, playback processing thereafter, and the like can be performed by the microcomputer 115 at high speed with suppressing increase in processing load.

Moreover, in the case of the conventional art shown in FIG. 18, the microcomputer 306 acquires in real time all TEXT data decoded into in the CD-TEXT decoder 305. On the other hand, in the case of the present invention, when the flag value stored in the flag value storage register 208 indicates that TEXT information is present, the microcomputer 115 can acquire only desired TEXT data from the RAM 111 at appropriate timings. Hence, it is not necessary to acquire all TEXT data decoded into in the CD-TEXT decoder 305 as in the conventional art. Hence, in the case of the present invention, determining whether TEXT information is present, playback processing thereafter, and the like can be performed by the microcomputer 115 at high speed with suppressing increase in processing load. Furthermore, in the case of the present invention, the microcomputer 115 does not need to include the RAM 307 for storing TEXT data shown in FIG. 18, and thus the configuration thereof can be simplified.

Moreover, in the case of the present invention, the RAM 111, which is work memory for error correction according to the CD-ROM standard, is also used as memory for storing TEXT data decoded into in the CD-TEXT decoder 114 and CRC results, but the present invention being not limited to this, new memory dedicated for storing TEXT data may be provided. However, if an optical disk 100 compliant with another CD standard than the CD-ROM standard is mounted, decoding for CD-ROMs is not performed, and hence the CD-ROM error correction section 110 and RAM 111 do not operate. The case where TEXT data is decoded into in the CD-TEXT decoder 114 is just a case where the optical disk 100 is compliant with another CD standard than the CD-ROM standard. Hence, the RAM 111 can also be used as memory for storing TEXT data and CRC results eliminating the need for the provision of new memory, and the configuration of the CD-TEXT playback apparatus can be simplified.

SECOND EMBODIMENT

Configuration of a CD-TEXT Playback Apparatus

Figure 5:
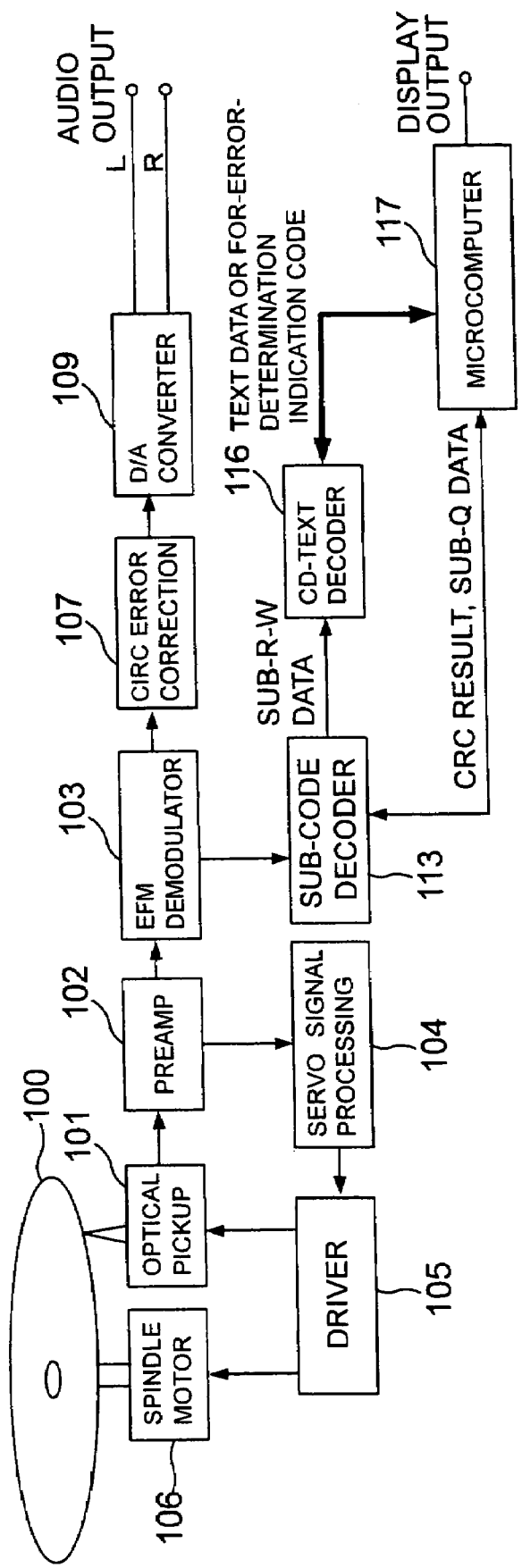
FIG. 5 is a diagram illustrating the configuration of an optical disk playback apparatus according to a second embodiment of the present invention.

FIG. 5 is a diagram illustrating the configuration of a CD-TEXT playback apparatus according to a second embodiment of the present invention. Note that the same constituents as in FIG. 1 are indicated by the same reference numerals with a description thereof being omitted.

A CD-TEXT decoder 116 is an embodiment of the "decoder" according to the second embodiment of the present invention. The CD-TEXT decoder 116 decodes into the TEXT information according to the CD-TEXT standard from the sub-R-W data sent from the sub-code decoder 113. Also, each time TEXT information is decoded into, the CD-TEXT decoder 116 performs CRC based on the CRC code included in the TEXT information to detect whether the result of decoding into the TEXT information is normal. The CRC result for the TEXT information is used to determine whether the TEXT information is recorded on the optical disk 100.

Also, when the CRC result is normal, the CD-TEXT decoder 116 generates a total of 16 bytes of TEXT data (a "first data set") consisting of 4 bytes of decoded ID1 to ID4 and 12 bytes of TEXT content and sends to a microcomputer 117. On the other hand, when the CRC result is not normal, the CD-TEXT decoder 116 generates an indication code for error determination (a "second data set") which is of the same data size as the TEXT data, i.e., 16 bytes and which indicates that the CRC result is not normal, and sends to the microcomputer 117.

The microcomputer 117 controls the whole of the CD-TEXT playback apparatus overall. For example, the microcomputer 117 analyzes TOC information based on the sub-Q data sent from the sub-code decoder 113 to display decoded-into TEXT information from the optical disk 100, and acquires information about the position on the optical disk 100 where a desired music program is recorded, and the like. Then, based on this position information, the servo of the optical pickup 101 is controlled to read and playback the desired music program.

Moreover, where TEXT information is recorded on the optical disk 100, in order to playback/display TEXT information corresponding to the desired music program synchronously with the playback of the desired music program, the microcomputer 117 performs the following processing:

When receiving 16 bytes of TEXT data from the CD-TEXT decoder 116, the microcomputer 117 realizes that the CRC result for the TEXT data is normal, and performs display processing on the TEXT content included in the TEXT data and outputs to an external display device. On the other hand, when receiving the 16 bytes of for-error-determination indication code from the CD-TEXT decoder 116, the microcomputer 117 realizes that the CRC result for the TEXT data is not normal, and performs predetermined error processing such as rereading sub-code information from the lead-in area 11.

Configuration of the CD-TEXT Decoder

Figure 6:
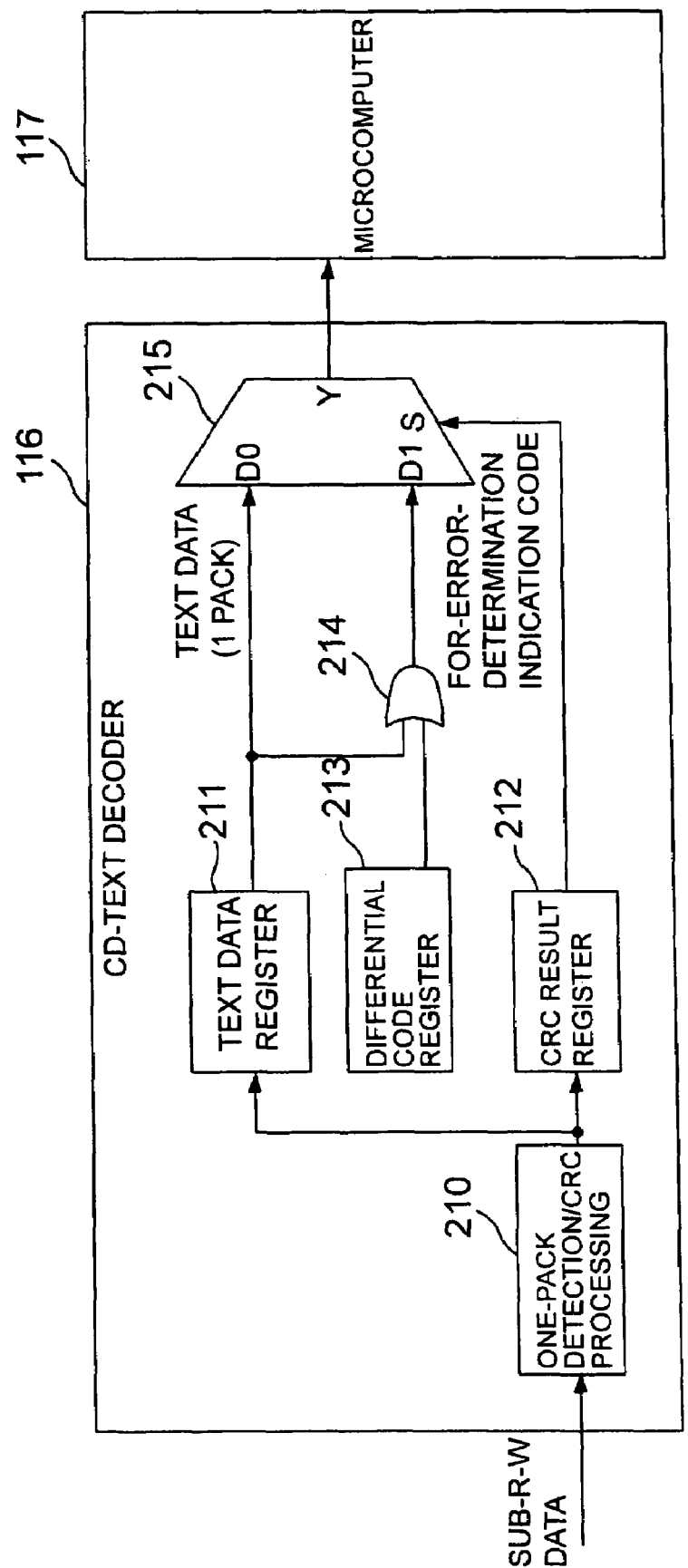
FIG. 6 is a diagram illustrating the configuration of a decoder according to the second embodiment of the present invention.

FIG. 6 is a block diagram showing the configuration of the CD-TEXT decoder 116 according to the second embodiment of the present invention.

The feature of the CD-TEXT decoder 116 according to the present invention is that, when the CRC result for TEXT data is normal, the TEXT data of one pack is sent to the microcomputer 117, and when the CRC result for TEXT data is not normal, a for-error-determination indication code is sent to the microcomputer 117.

Here, the for-error-determination indication code is configured to have 4 bytes of header information the content of which is out of the CD-TEXT standard and 12 bytes of decoded TEXT content. That is, for when the CRC result is not normal, the for-error-determination indication code takes on a data structure similar to that of one pack of TEXT data for when the CRC result is normal. By this means, a mechanism for generating the for-error-determination indication code and a mechanism for sending the for-error-determination indication code to the microcomputer 117 can be realized efficiently by using existing mechanisms of the CD-TEXT playback apparatus.

Figure 7:
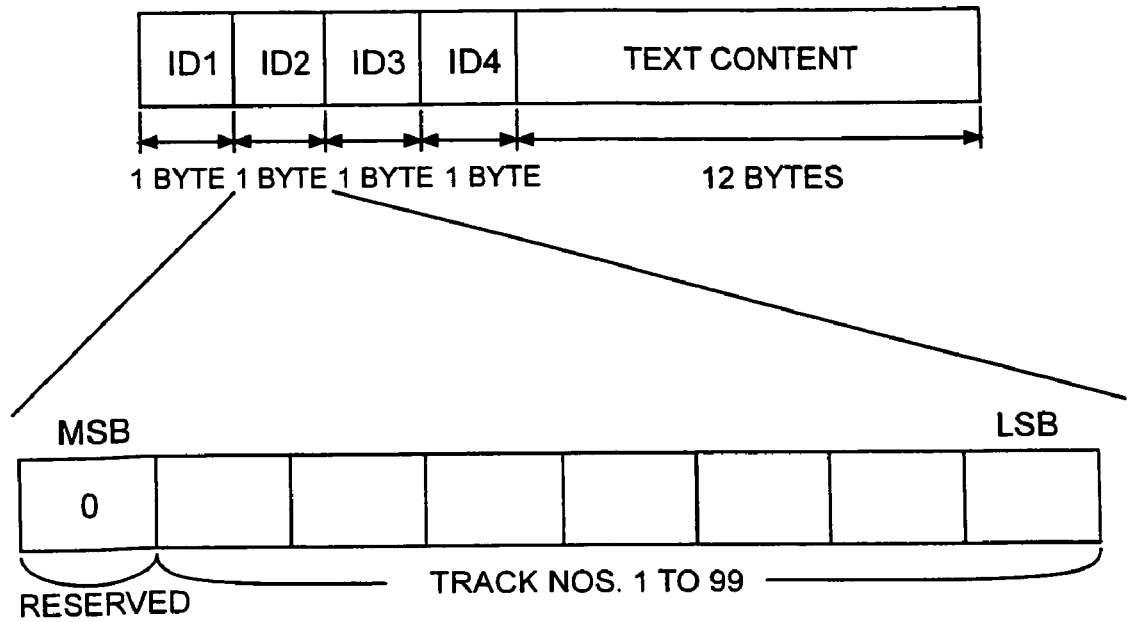
FIG. 7 is a diagram showing the configuration of one packet of TEXT data sent to a microcomputer from the decoder according to the second embodiment of the present invention.

The for-error-determination indication code adopted by the CD-TEXT decoder 116 of FIG. 6 is a code as shown in FIG. 7, of which the second byte ID2, which can be set to one of track numbers of from 1 to 99 in decimal notation, is set to a binary number that corresponds to one of numbers of from 100 to 127 in decimal notation. That is, the for-error-determination indication code is header information having its content changed to that being out of the CD-TEXT standard.

Figure 8:
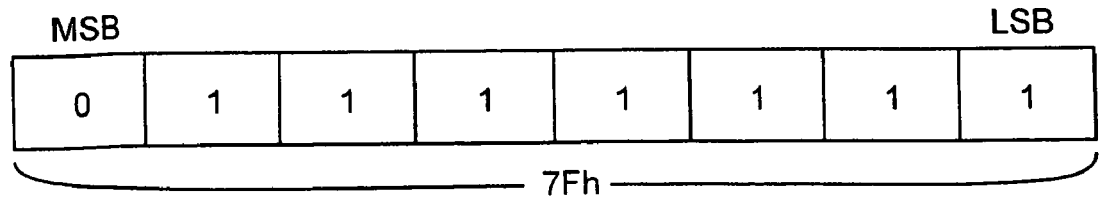
FIG. 8 is a diagram showing a differential code according to the second embodiment of the present invention.

In the example shown in FIG. 6, in order to simplify the configuration of the CD-TEXT decoder 116 and to use the existing specification of the microcomputer 117, the ID2 of the for-error-determination indication code has its 7 bits all set to "1" except the most significant bit (always being "0" in specification). That is, the ID2 of the for-error-determination indication code is "01111111" in binary notation as shown in FIG. 8 and "7Fh" in hexadecimal notation. For this case, the configuration of the CD-TEXT decoder 116 will be described below.

A one-pack detection/CRC processing section 210 detects one pack of sub-R-W data from the sub-R-W data being sent by the sub-code decoder 113 sequentially on a one packet (4 packs) basis on the basis of the synchronization patterns S0, S1 having a period of 1/75 sec, and decodes the one pack of sub-R-W data into one pack of TEXT data. The packs of decoded-into TEXT data are sequentially stored in a TEXT data register 211. Note that one pack of TEXT data stored in the TEXT data register 211 consists of 4 bytes of header information ID1 to ID4 and 12 bytes of TEXT content without the CRC code.

Furthermore, the one-pack detection/CRC processing section 210 performs CRC based on the CRC code included in one pack of decoded-into TEXT data, and sequentially stores the CRC results in a CRC result register 212. For example, the CRC result is at 1 when an error is not detected according to the CRC scheme (when normal) and at 0 when an error is detected (when not normal).

A differential code register 213 is a register that stores 16 bytes of differential code for generating 16 bytes of for-error-determination indication code. Because ID2 of the for-error-determination indication code is "7Fh" in hexadecimal notation as shown in FIG. 8, a header portion, the 4 higher-order bytes, of the differential code becomes "007F0000", and the 12 remaining bytes of the differential code are all at zero.

An OR device 214 performs logical addition of 16 bytes of TEXT data stored in the TEXT data register 211 and the 16 bytes of differential code stored in the differential code register 213. As a result, the OR device 214 outputs 16 bytes of for-error-determination indication code having the ID2 changed to "7Fh" in hexadecimal notation. That is, because the ID2 of the for-error-determination indication code has all 7 bits except the most significant bit being at zero, the for-error-determination indication code can be generated with a simple mechanism, the logical addition in the OR device 214.

A multiplexer 215 has input thereto 16 bytes of TEXT data stored in the TEXT data register 211 and 16 bytes of for-error-determination indication code output from the OR device 214. Further, the multiplexer 215 is supplied with the CRC result stored in the CRC result register 212 as a control signal to select one of the two inputs. Here, if the CRC result supplied from the CRC result register 212 is at 1 indicating being normal, the 16 bytes of normal TEXT data is selected. On the other hand, if the CRC result supplied from the CRC result register 212 is at 0 indicating being not normal, the for-error-determination indication code is selected. Then, one of the TEXT data and the for-error-determination indication code selected by the multiplexer 215 is sent to the microcomputer 117.

Operation of the CD-TEXT Playback Apparatus

Figure 9:
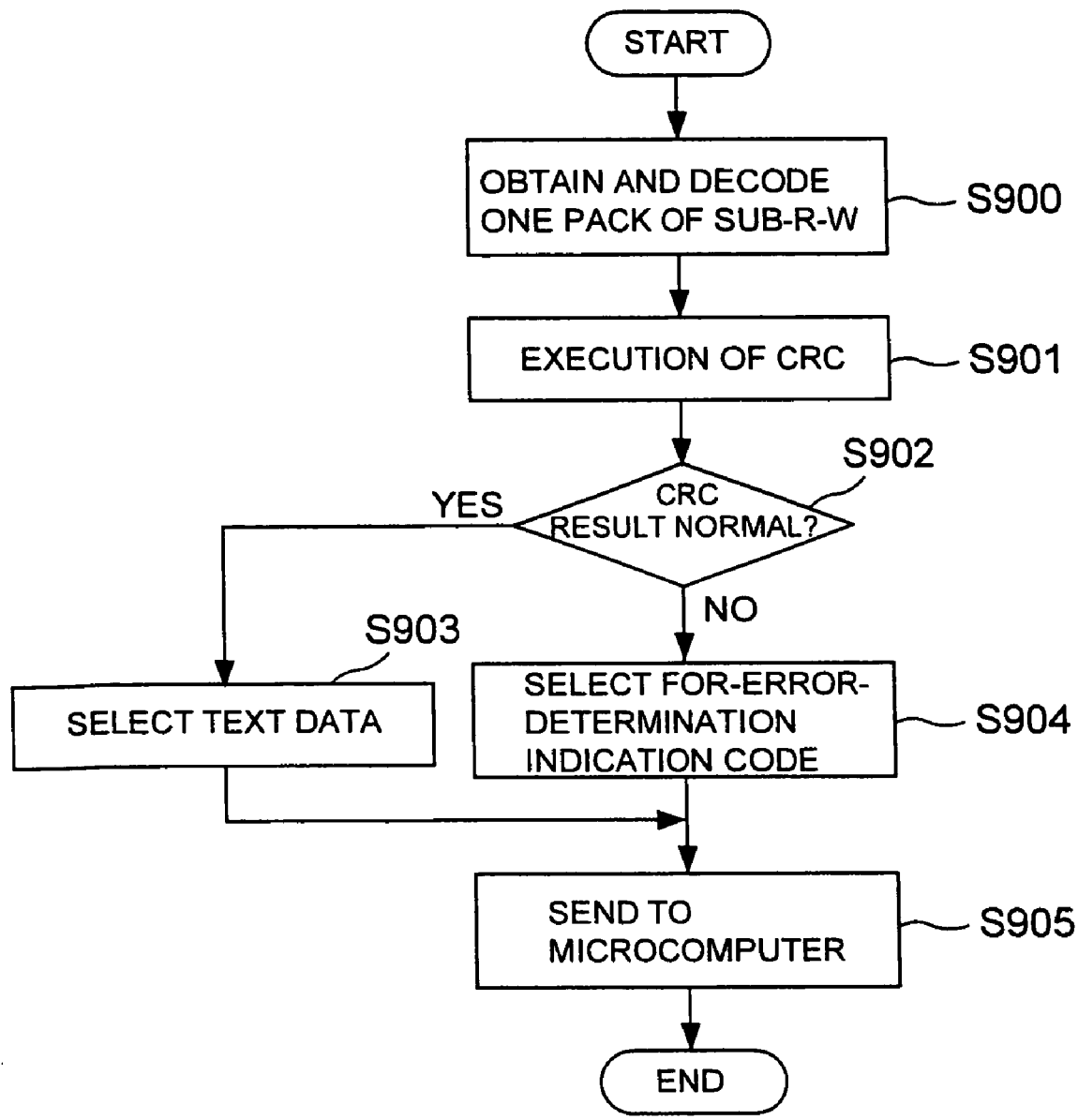
FIG. 9 is a flow chart showing a flow of optical disk playback processing according to the second embodiment of the present invention.

The operation of the CD-TEXT playback apparatus according to the second embodiment of the present invention will be described with reference to the flow charts shown in FIG. 9. Note that it is assumed that the microcomputer 117 has already acquired sub-Q data decoded by the sub-code decoder 113 and finished TOC analysis.

First, in order to read out sub-code information recorded in the lead-in area 11 of the optical disk 100 to decode into TEXT information, the microcomputer 117 makes the servo signal processing section 104 activate the servo control of the optical pickup 101. As a result, sub-code information is read from the lead-in area 11, and after amplified in the preamp 102, is EFM-demodulated in the EFM demodulator 103, and sent to the sub-code decoder 113. Then, the sub-code decoder 113 decodes the EFM-demodulated sub-code information. At this time, the sub-code decoder 113 sequentially sends to the CD-TEXT decoder 116 the sub-R-W data on a one packet (4 packs) basis on the basis of the synchronization patterns S0, S1 having a period of 1/75 sec.

The CD-TEXT decoder 116, while detecting one pack of sub-R-W data by the one-pack detection/CRC processing section 210, decodes the one pack of sub-R-W data into one pack of TEXT data (S900). The one pack of decoded-into TEXT data is stored in the TEXT data register 211. Note that the TEXT data stored in the TEXT data register 211 is supplied to the multiplexer 215, and also the for-error-determination indication code that is a logical sum of the differential code stored in the differential code register 213 and the TEXT data is supplied to the multiplexer 215.

The one-pack detection/CRC processing section 210 performs CRC based on the CRC code included in the one pack of decoded-into TEXT data, and stores the CRC result in the CRC result register 212 (S901).

The CD-TEXT decoder 116 selects one of the TEXT data and the for-error-determination indication code by the multiplexer 215 based on the CRC result in the CRC result register 212, and sends to the microcomputer 117. More specifically, if the CRC result is at 1 indicating being normal (S902: YES), the TEXT data is selected (S903), and if the CRC result is at 0 indicating being not normal (S902: NO), the for-error-determination indication code is selected (S904). Then, one of the TEXT data and the for-error-determination indication code selected by the multiplexer 215 is sent to the microcomputer 117.

Then, the microcomputer 117 receives the TEXT data or the for-error-determination indication code from the CD-TEXT decoder 116. When receiving the TEXT data, the CD-TEXT decoder 116 realizes that the CRC result for the TEXT data is normal and performs processing on the TEXT data to display corresponding TEXT information. On the other hand, when receiving the for-error-determination indication code, the microcomputer 117 realizes that the CRC result for the TEXT data is not normal, and performs predetermined error processing.

EXAMPLE OF EFFECTS

In the case of the conventional art shown in FIG. 18, the CD-TEXT playback apparatus needs to execute the procedure for obtaining one bit of CRC result and determining before the microcomputer acquires 16 bytes of TEXT data.

On the other hand, in the case of the present invention, without executing independently sequentially the step of obtaining a CRC result and determining and the step of acquiring the TEXT data, by once executing the procedure for the TEXT data or the for-error-determination indication code being sent from the CD-TEXT decoder 116 to the microcomputer 117, the microcomputer 117 can perform obtaining the CRC result and determining, and acquiring the TEXT data at the same time. Thus, with suppressing increase in processing load in the microcomputer 117, optical disk playback processing such as the display of TEXT information decoded into in the CD-TEXT decoder 116 and producing audio output can be speeded up.

OTHER EMBODIMENTS

Although in the above second embodiment the ID2 of the for-error-determination indication code is "7Fh" in hexadecimal notation, the present invention is not limited to this. For example, all bits including the most significant bit of the ID2 of the for-error-determination indication code may be at 1, although the amount of change in the specification of the microcomputer 117 increases. In this case, the ID2 of the for-error-determination indication code is "FFh" in hexadecimal notation.

Alternatively, all bits of a header portion, the 4 higher-order bytes, of the for-error-determination indication code may be at 1. In this case, the header portion, the 4 higher-order bytes, of the for-error-determination indication code is "FFFFFFFFh" in hexadecimal notation. Furthermore, when the CRC result is not normal, the 12 bytes of TEXT content included in the for-error-determination indication code is not used by the microcomputer 117, and hence all bits of the 12 bytes of TEXT content may be at 1.

Although the preferred embodiment of the present invention has been described in detail, the above embodiment is provided to facilitate the understanding of the present invention and not intended to limit the present invention. It should be understood that various changes and alterations can be made therein without departing from spirit and scope of the invention and that the present invention includes its equivalents.

What is claimed is:

1. An optical disk playback apparatus which reads out sub-code information recorded in advance from a lead-in area of a CD standard optical disk, and decodes into and playbacks TEXT information according to a CD-TEXT standard from R-W channel data of the sub-code information, the playback apparatus comprising:

a decoder that decodes into the TEXT information from the R-W channel of the sub-code information read out from the lead-in area and determines whether the TEXT information is present based on a result of decoding the R-W channel data into the TEXT information, in parallel with being decoded into TOC information from Q channel data of the sub-code information read out, wherein the TEXT information is formed from a plurality of packs that each comprises header information, a TEXT content, and an error detection code, and wherein the decoder, each time part of the R-W channel data for one of the packs is read out, performs error detection based on the error detection code included in the one pack, in parallel with reading out the Q channel data from the lead-in area, and the decoder determines that the TEXT information is present if the number of times when normal is above a predetermined reference value in results of the error detection for a predetermined number of packs, and that the TEXT information is nonexistent if the number of times when normal is not above the predetermined reference value.

2. The optical disk playback apparatus according to claim 1, wherein the decoder comprises:

a counter that counts the number of times when a result of the error detection is detected to be normal;

a reference value storage register that stores the predetermined reference value; and a comparator that compares a count of the counter with the predetermined reference value stored in the reference value storage register, and wherein the decoder determines that the TEXT information is present if the comparing result of the comparator indicates that the count is above a predetermined reference value, and that the TEXT information is nonexistent if the comparing result indicates that the count is not above the predetermined reference value.

3. The optical disk playback apparatus according to claim 2, further comprising:

a microcomputer that controls the whole of an optical disk playback system; and a memory that the decoded-into TEXT information is to be written into and the microcomputer can access, wherein each time part of the R-W channel data for one of the packs is read out and decoded into one pack of the TEXT information, the decoder writes the decoded-into one pack of the TEXT information into the memory, and where performing display processing on desired pack of the TEXT information, the microcomputer reads out the desired pack of the TEXT information written in advance in the memory.

4. The optical disk playback apparatus according to claim 3, wherein the memory is used also as work memory for error correction according to a CD-ROM standard.

5. The optical disk playback apparatus according to claim 3, wherein the decoder further comprises a flag value storage register that stores a comparing result of the comparator as a flag value, and the microcomputer monitors the flag value stored in the flag value storage register, and where performing display processing on desired pack of the TEXT information, if the flag value indicates that the TEXT information is present, the microcomputer reads out the desired pack of the TEXT information written in advance in the memory.

6. An optical disk playback apparatus having a decoder which decodes R-W channel data of sub-code information read out from a lead-in area of a CD standard optical disk into TEXT information formed from a plurality of packs that each comprises header information according to a CD-TEXT standard, a TEXT content, and an error detection code, while performing error detection on the decoded-into TEXT information based on the error detection codes included in the respective packs, and a microcomputer which, if a result of the error detection is normal, makes corresponding decoded-into TEXT content be displayed, wherein:

the decoder sends to the microcomputer, if a result of the error detection is normal, a first data set consisting of corresponding decoded-into header information and TEXT content and, if a result of the error detection is not normal, a second data set which is of the same data size as the first data set and which is an indication code indicating that the result of the error detection is not normal, and the microcomputer, when receiving the first data set, realizes that the result of the error detection is normal and makes the TEXT content included in the first data set be displayed, and when receiving the second data set, realizes that the result of the error detection is not normal.

7. The optical disk playback apparatus according to claim 6, wherein the second data set consists of header information whose content has been changed to that being out of the CD-TEXT standard and corresponding decoded-into TEXT content.

8. The optical disk playback apparatus according to claim 7, wherein the header information according to the CD-TEXT standard consists of four identifications of one byte each, and the header information of whose four identifications a second byte identification, which can be set to one of track numbers of from 1 to 99 in decimal notation, is set to a binary number that corresponds to one of numbers of from 100 to 127 in decimal notation is used as the header information whose content has been changed to that being out of the CD-TEXT standard.

9. A decoder which decodes R-W channel data of sub-code information read out from a lead-in area of a CD standard optical disk into TEXT information formed from a plurality of packs that each comprises header information according to a CD-TEXT standard, a TEXT content, and an error detection code, while performing error detection on the decoded-into TEXT information based on the error detection codes included in the respective packs, the decoder being connected to a microcomputer that controls the whole playback processing of a CD standard optical disk, wherein:

the decoder generates, if a result of the error detection is normal, a first data set consisting of corresponding decoded-into header information and TEXT content, which data set is made by the microcomputer to be displayed, and, if a result of the error detection is not normal, a second data set which is of the same data size as the first data set and which is an indication code indicating that the result of the error detection is not normal.

* * * * *

UNITED STATES PATENT AND TRADEMARK OFFICE
CERTIFICATE OF CORRECTION

PATENT NO. : 7,539,092 B2  Page 1 of 1
APPLICATION NO. : 11/129575
DATED : May 26, 2009
INVENTOR(S) : Koichi Abe It is certified that error appears in the above-identified patent and that said Letters Patent is hereby corrected as shown below:

On the Cover Page, under "References Cited", Column 2, line 4, delete "JP 2003-36650    2/2003".

Column 15, Claim 1, line 8, after "channel" insert --data--.

Signed and Sealed this

Twenty-ninth Day of September, 2009

David J. Kappos
*Director of the United States Patent and Trademark Office*